United States Patent Office
3,512,579
Patented May 19, 1970

3,512,579
DUAL CONTROL THERMOSTAT
Nicholas G. Muskovac, Rockville, Md., assignor to Vectrol, Inc., Rockville, Md., a corporation of Maryland
Filed Oct. 8, 1968, Ser. No. 765,843
Int. Cl. F25b 29/00
U.S. Cl. 165—26      10 Claims

ABSTRACT OF THE DISCLOSURE

A branch selecting means couples either a heating or cooling unit to a control rectifier circuit, and the units are fired in accordance with temperature by rectifier conduction which is controlled by a thermally-responsive impedance.

Background of the invention

This invention relates to a dual controlled thermostat and more particularly to a solid state thermostat for heating and cooling of an environment.

Environmental control is becoming of increasing importance in modern technology. In this regard, adequate regulation of a particular environmental condition often requires selective control of units which have opposite effects on the environment, as for example, when both heating and cooling of a given volume is required.

In the prior art, this dual regulation is often provided by two separate systems each controlling a particular load in response to its own condition-responsive means. Moreover, such systems generally utilize magnetic and mechanical thermostats which are subject to wear and the like.

It is an object of this invention to provide an economical dual control thermostat.

It is another object of this invention to provide a dual control thermostat for separate control of devices having opposite effect on the environment.

It is still further object of this invention to provide an economical thermostat which automatically selects and energizes a particular load in accordance with environmental conditions.

Summary of the invention

A thermostat for maintaining thermal conditions of an environment by controlled firing of a heating or cooling unit in accordance with temperature, comprises: at least one control rectifier circuit having its input coupled to a source of alternating current and its output adapted for selective coupling to firing means of said units, said rectifier circuit having a thermally-responsive impedance for controlling conduction thereof in accordance with temperature; and a branch selecting means adapted for coupling of one of said units to said rectifier circuit.

In one embodiment, a single rectifier circuit is adapted for coupling to either a heating or cooling unit, and a branch selecting means inverts sensor response and selectively couples a particular unit to the circuit.

In another embodiment, a thermally-responsive impedance is provided in a bridge network which controls conduction of a pair of control rectifier circuits, one of said rectifier circuits being coupled to a firing means of a heating unit, the other of said rectifier circuits being coupled to firing means of a cooling unit, said bridge circuit providing a null at the temperature to be maintained, said one rectifier circuit being made to conduct in accordance with sensor response to one direction, and said other rectifier circuit being made to conduct in accordance with sensor response in the other direction.

Description of the preferred embodiment

Figure 1:
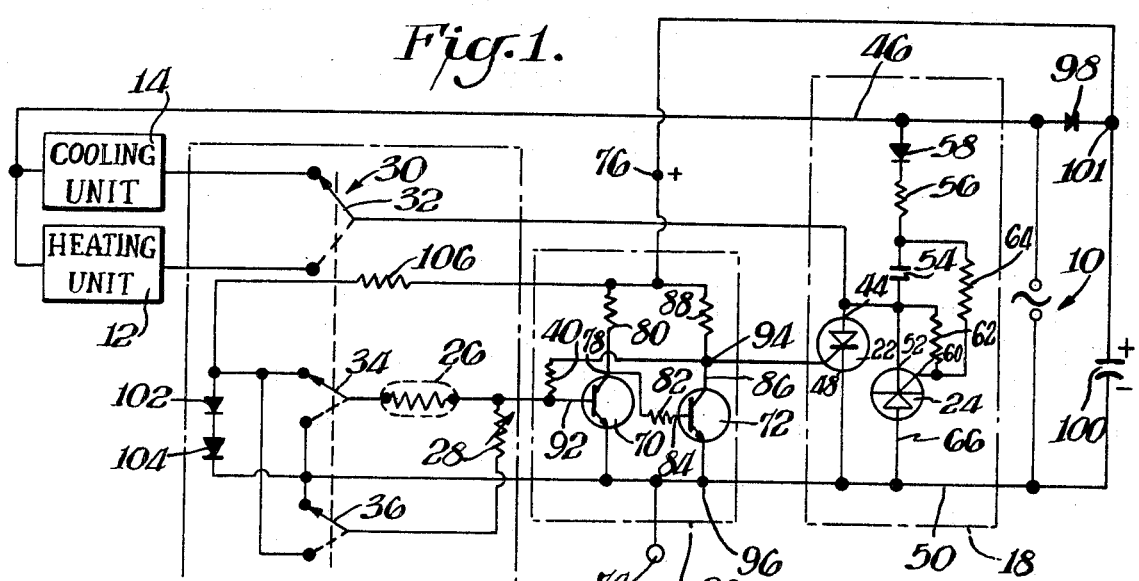
FIG. 1 is a schematic diagram of a dual control thermostat provided in accordance with the invention.

In the preferred embodiment, the thermostat is designed for home or industrial environmental control in which heating and cooling units, operated by electricity, oil or gas, are fired through a relay or the like from a low voltage source. In FIG. 1, a low voltage alternating source 10 to 24 volts or the like is utilized to fire heating unit 12 or cooling unit 14 in accordance with sensing network 16. Units 12 and 14 are serially connected to source 10 through a control rectifier circuit 18 whose conduction is controlled by a gate trigger circuit 20 and sensing network 16.

Rectifier circuit 18 includes a pair of control rectifiers 22 and 24 such as thyristors or the like connected in anti-parallel or back to back arrangement with their anode-cathode circuit in series between source 10 and unit 12 or 14.

Sensing circuit 16 includes a thermally-responsive impedance or sensor 26 which controls the state of trigger circuit 20 in accordance with temperature. An adjustable resistance 28, such as a potentiometer, is provided in series with sensor 26 for temperature selection, that is for adjustment of overall response of the circuit to temperature. Circuit 16 also includes a branch selecting means 30 which effectively inverts sensor response to circuit 20 and simultaneously switches the coupling of units 12 and 14 to rectifier circuit 18.

In this embodiment, branch selecting means 30 is a three-pole switch having a pair of poles 34 and 36 for providing appropriate inversion of the sensor response and a third pole 32 providing switching of units 12 and 14.

In the circiut of FIG. 1, control rectifiers 22 and 24 are silicon controlled rectifiers such as thyristors or the like. Thyristor 22 is fired by trigger circuit 20, and draws current from source 10 through either unit 12 or 14. Thyristor 24, however, is slaved by the load to fire each half-cycle following firing of thyristor 22.

The anode 44 of thyristor 22 is connected through switch 30 to either load 12 or 14 which are, in turn, connected to line 46 from one side of source 10 whereas its cathode 48 is connected to the other side of the line 50 such that upon triggering of thyristor 22 current is passed through the load.

Since thyristor 22 will only fire during its conductive half-cycles, that is when positive anode voltage is applied to its anode 44, conduction during alternate half-cycles is provided by thyristor 24. This is accomplished by direct connection of its cathode 52 to anode 44 of thyristor 22 and by connection to line 46 through a series string made up of capacitor 54, resistor 56 and diode 58. Cathode 52 is also connected to its gate electrode 60 through a shunt resistor 62 while a second series current limit resistor 64 connects capacitor 54 to gate 62 as shown. The circuit is completed by connection of the anode 66 of thyristor 24 to line 50.

In operation, diode 58 charges capacitor 54 through resistor 56 whenever thyristor 22 is fired. This occurs when the cathode 52 of thyristor 24 is positive. Then during the next half-cycle, when anode 66 is positive, capacitor 54 is discharged such that a positive voltage occurs at gate 60 which in turn fires this thyristor during its conductive half-cycle.

Gate circuit 20, which controls the firing of thyristor 22, includes first and second NPN transistors 70 and 72. These have their emitters connected in common to line 50 and a source 74 of negative DC voltage, and their collectors connected through respective resistors to the base of the other transistor and a positive DC voltage source 76. Hence, collector 78 of transistor 70 is connected through resistor 80 to source 76 and through resistor 82 to base 84 of transistor 72. On the other hand, collector 86 of transistor 72 is connected, in turn, through resistor 88 to source 76 and through resistor 90 to base 92 of transistor 70.

Conduction of transistor 70 is determined by its base voltage which is set by sensing circuit 16. Transistor 72, on the other hand, is controlled by transistor 70. That is, resistors 80, 82, 88 and 90 are chosen to provide a base voltage on transistor 72 which holds this transistor in a nonconducting state when transistor 70 is conducting and vice versa.

The output of trigger circuit 20 is developed across the collector to emitter of transistor 72 at junctions 94 and 96, respectively, which are directly connected to the gate and cathode of rectifier 22. Hence, thyristor 24 is made to conduct, or fire, when transistor 72 is in an "off" state which produces a positive voltage between junction 94 to 96.

The DC of terminals 74 and 76 may be provided from a separate source, however, in this embodiment the DC is provided by a diode 98 and capacitor 100 which are connected in series across source 10 as shown. Terminal 76 is connected to the junction 101 between diode 98 and capacitor 100 and supplied with positive DC voltage therefrom, whereas terminal 74 is connected through line 50 to the negative electrode of capacitor 100.

The desired room temperature, that is the switching temperature of the overall circuit, is set by potentiometer 28. Potentiometer 28 is calibrated against the temperature-resistance curve of sensor 26 and accordingly marked so that when a temperature setting of the potentiometer is manually chosen, the potentiometer resistance corresponds to the resistance of sensor 26 at the selected temperature.

Sensing circuit 16 is constructed, as more fully explained below, to switch transistor 70 when sensor 26 and potentiometer 28 are equal in resistance, and as indicated, the state of transistor 70 determines the state of trigger circuit 20 and rectifier circuit 18.

Consequently, thyristor 22 is fired in accordance with the state of trigger circuit 20 which is, in turn, dependent upon the temperature of the environment and the position of switch 30. As indicated, switch 30 provides an effective inversion of the sensor response, that is in inverts sensor input to circuit 20 (by interchanging sensor 26 and potentiometer 28) and at the same time selects a particular load.

Figure 2:
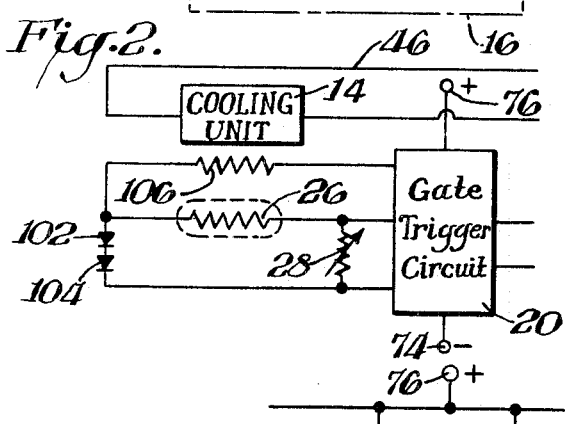
FIG. 2 is a schematic diagram of the control portion of the circuit illustrating one position of the branch selecting means of FIG. 1.
Figure 3:
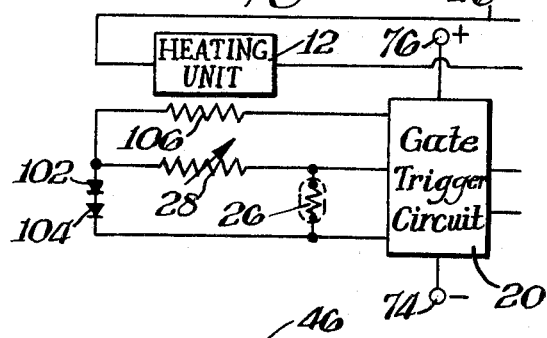
FIG. 3 is a schematic diagram of the control portion of the circuit illustrating the other position of the branch selecting means.

The two switched states of sensing circuit 16 are schematically illustrated in FIGS. 2 and 3. FIG. 2 illustrates the circuit with switch 30 in its first position as shown in the solid lines of FIG. 1, while FIG. 3 illustrates the condition of circuit 16 when switch 30 is in its alternate position as shown in dotted lines in FIG. 1.

Constant input voltage to sensing circuit 16 is provided by diodes 102 and 104 which are fed from DC source 76 through current limiting resistor 106. Resistor 106 and diodes 102, 104, which are connected across the series branch consisting of sensor 26 and potentiometer 28, are chosen to provide a voltage input to the branch of twice the base-to-emitter voltage drop of transistor 70. This allows calibration of the potentiometer to the sensor and permits interchange of sensor 26 and potentiometer 28 during the heat and cool cycle while maintaining this temperature calibration.

Diodes 102, 104 may be replaced by any constant voltage source which will provide a voltage input to sensor 26 and potentiometer 28 which is twice the threshold or turn on voltage of the transistor 70. For example, a single Zener diode of the correct value will be satisfactory, however, for economy resistor 106 and two conventional diodes are utilized. For a more versatile sensing circuit, resistor 106 may be made adjustable so as to provide a voltage input appropriate to other trigger circuits.

Since diodes 102, 104 are chosen to provide twice the threshold voltage of transistor 70, the on-off or switching point of transistor 70 (and trigger circuit 16) occurs when sensor resistance equals the potentiometer resistance.

Hence, in the first position of switch 30 as shown in FIG. 2, potentiometer 28 is connected across the input to trigger circuit 20 (across the base-to-emitter of transistor 70) so that trigger circuit 20 will fire rectifier circuit 18 when the resistance of sensor 26 is less than that of potentiometer 28.

This follows from the fact that sensor 26 and potentiometer 28 are connected in series across diodes 102, 104. When both resistances are equal, the voltage of each is equal to that of one diode; that is the threshold voltage of transistor 70. If sensor 26 is low in resistance, the voltage on potentiometer 28 is therefore greater than the threshold voltage and transistor 70 is turned "on."

In this embodiment, a negative temperature coefficient sensor, such as an NTC thermistor or the like is utilized so that in the switch position of FIG. 2 the cooling load 14 will only be fired with temperatures greater than that selected for potentiometer 28. In the switch position of FIG. 3, however sensor 26 is across the input to circuit 20, and consequently, rectifier circuit 18 (and load 12) are only fired when the resistance of sensor 26 exceeds that of potentiometer 28; that is with an NTC sensor at temperatures less than that set for potentiometer 28.

This switch from heating to cooling without change of potentiometer 28 is made possible by the constant voltage input from diodes 102, 104 of twice the threshold voltage of trigger circuit 20 such that the "on" to "off" point of transistor 70 (or switching point of circuit 20) occurs when the resistance of sensor 26 equals that of potentiometer 28. Consequently, these may be interchanged to invert circuit response without changing the temperature calibration. It should also be noted that a positive temperature coefficient (PTC) sensor may also be employed by merely interchanging the cooling and heating unit in their connection to pole 32.

The following circuit parameters are provided as an example of the dual control thermostat of FIG. 1 which is designed for maintaining room temperatures by firing conventional heating and cooling units by means of a solenoid or relay.

Source 10— 24 volts
Unit 12—24 volt solenoid or relay controlled heating unit
Unit 14—24 volt solenoid or relay controlled cooling unit
Control Rectifiers 22, 24—Sprague TR701
Sensor 26—Fenwal NTC Part No. CA 25J1, 500 ohms at 25° C. or Carborundum PTC Part No. A0905P–11, 600 ohms at 25° C.
Potentiometer 28—500 ohms or 1000 ohms, ½ watt, linear
Switch 30—3 pole, double throw
Diode 58—1N645
Resistor 56—4.7K., ½W.
Capacitor 54—0.35 mfd., 6 volts, ±20%
Resistor 62—1K., ½W.
Resistor 64—10K., ½W.
Transistors 70, 72—Sprague 2N2923 or 2N2924
Resistor 80—10K., ½W.
Resistor 82—4.7K., ½W.
Resistor 88—4.7K., ½W.

Resistor 90—390K., ½ W.
Diode 98—1N645
Capacitor 100—50 mfd., 50 volts
Diodes 102, 104—1N645 or any P-N silicon junction with typical drop of 0.6 volt at 10 ma.
Resistor 106—3.3K., 1W. fixed resistor, or 5K. potentiometer if tighter calibration between heat and cool is desired.

Many different embodiments are possible. PNP transistors may be utilized for the trigger circuit with appropriate circuit modifications and other flip-flop type circuits may be utilized. In fact, the basic sensing circuit 16 may be employed with a variety of gate trigger circuits.

A triac may also be employed as the control rectifier in the embodiment illustrated in FIG. 1. In this case, thyristors 22 and 24 are replaced with a triac having its anode connected to pole 32 of switch 30 and its gate and cathode connected to junctions 94 and 96, respectively.

Figure 4:
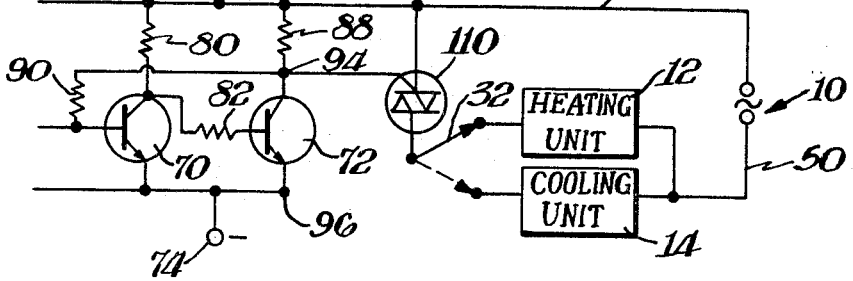
FIG. 4 is a schematic diagram illustrating an alternative rectifier circuit for use in FIG. 1.

Since a triac can also be fired with a negative gate signal, this rectifier can also be utilized in the alternate arrangement shown in FIG. 4. Herein, a triac 110 is fired by the signal developed across collector resistor 88. This voltage is of opposite polarity to that between junctions 94 and 96, and in contrast to previously described embodiments, will fire triac 110 (and the appropriate load) when transistor 72 is "on" rather than "off." Hence, the load connections to pole 32 must be opposite to the connections of FIG. 1, and for an NTC sensor the load connections would be as shown in FIG. 4.

Figure 5:
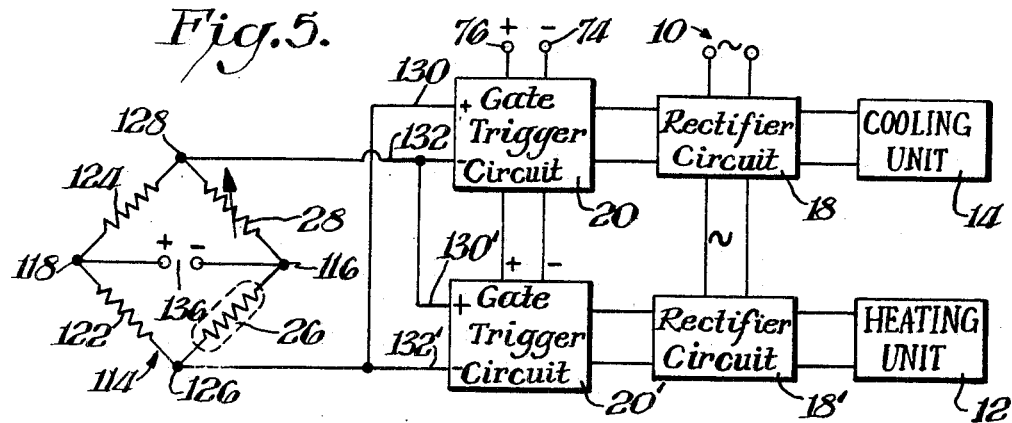
FIG. 5 is a schematic diagram of a further embodiment of the invention.

FIG. 5 illustrates a further embodiment of the dual control thermostat wherein sensor 26 is employed in a resistive bridge network 114 which automatically triggers separate control rectifier circuits 18 and 18' to fire either heating unit 12 or cooling unit 14 in accordance with temperature. Hence in this embodiment, bridge 114 provides an automatic or thermally-responsive branch selecting means.

The gate trigger circuits of this embodiment are identical to each other and that employed in FIG. 1, hence, they are enumerated as 20 and 20'. Similarly, any of the rectifier circuits previously described will also be applicable to this embodiment.

As shown in FIG. 5, sensor 26 and potentiometer 28 are connected together at junction 116 to form one half of bridge 114 while resistors 122, 124 are connected together at junction 118 to form the other half. The bridge is completed by joining of these halves at junctions 126 and 128. The bridge is energized with DC from an isolated source 136 by connection to junctions 116 and 118.

The output of bridge 114 is taken from junctions 126, 128 and applied with opposite polarity to trigger circuits 20 and 20'. Hence, junction 128 is connected to a positive or first input terminal 130 (base terminal of transistor 70, for example) of circuit 20 and a negative or second input terminal 132' of the other trigger circuit 20'. Conversely, junction 126 is connected to the negative terminal 132 (emitter of transistor 70, for example) of circuit 20 and the positive terminal 130' of circuit 20'. Consequently, trigger circuit 20 and rectifier circuit 18 are fired when bridge 114 provides sufficient voltage of one polarity and trigger circuit 20' and rectifier circuit 18' are fired with voltage of opposite polarity. For example, when junction 126 is more positive than 128 and its voltage exceeds the threshold voltage required, trigger circuit 20 is fired while opposite conditions operate circuit 20'.

The bridge operates to provide a null point at the desired temperature. For example in the preferred case, a null point at 74° F. with approximately ±2° F. span (72° to 76° F. band) is employed such that when the temperature equals or exceeds the upper limit 76° F. the cooling load 14 is fired whereas when the temperature is less than the lower band limit the heating load is fired.

In the preferred case, the resistance of resistors 122 and 124 are made substantially equal to each other and that of sensor 26 at its null point temperature. They are also equal to the resistance of potentiometer 28 at its midpoint adjustment. Then the response curve of the sensor, and the magnitude of the voltage input to the bridge, determines the width of the null band, and thus the sensitivity of the circuit.

The null point can be adjusted by potentiometer 28 which is calibrated to the temperature response of sensor 26. The range of adjustment will be limited, however, since the width of null band will also vary as the potentiometer resistance departs from the value of resistors 122 and 124. Of course the latter could also be adjustable and calibrated, if desired.

In any case, for the bridge polarity shown in FIG. 5 if sensor 26 is NTC thermistor or the like, temperatures above the null point will decrease sensor resistance thereby making junction 128 more positive than junction 126 so as to fire trigger circuit 20', rectifier circuit 18' and consequently, cooling unit 14. Conversely, lower temperatures make junction 128 more negative than junction 126 which fires circuit 18 and heating load 12.

Positive temperature coefficient (PTC) sensors may also be utilized in this circuit, in which case, units 12 and 14, the polarity of source 136 or the inputs to trigger circuits 20 and 20' must be interchanged.

The components of the circuit illustrated in FIG. 5 may be substantially identical to those given for the circuit of FIG. 1 with the addition of bridge resistors 122 and 124. For example, with a 24 volt AC source, a trigger supply of 30 volts DC, and components substantially identical to those given, a suitable bridge with its own DC supply of 6 to 10 volts and having a null point at 72 to 75° F. will be provided with resistor 122 and 124 each having 500 ohms.

While several embodiments have been described, many different embodiments are possible without departing from the spirit and scope of the invention, and it should be understood that the invention is not to be limited except as in the appended claims.

What is claimed is:
1. A thermostat for maintaining the temperature of an environment by controlled firing of a heating or cooling unit in accordance with thermal conditions, said thermostat comprising at least one control rectifier circuit adapted for serial connection to either of said units and an alternating curent source for firing of said unit upon conduction by said rectifier circuit; a trigger circuit for controlling the conduction of said rectifier circuit; a thermally-responsive sensor coupled to said trigger circuit for providing conduction of said rectifier circuit in accordance with temperature; and a branch selecting means adapted to provide an effective inversion of sensor response to said trigger circuit and coupling of a selected unit to said rectifier.

2. The thermostat of claim 1 including a resistance serially connected to said sensor; a source of substantially constant DC voltage coupled across said resistance and sensor, and said branch selecting means being adapted in one position to connect said sensor across the input to said trigger circuit and in its other position to connect said resistance thereacross.

3. The thermostat of claim 2 wherein said DC voltage is twice the threshold voltage of said trigger circuit so as to provide the switching point of said trigger circuit at that temperature at which said sensor and said resistance have substantially equal resistance.

4. The thermostat of claim 3 wherein said branch selecting means is a multi-pole switch, said switch adapted in one position to connect one of said units to the output of said rectifier circuit and to couple said sensor in series with the input to said trigger circuit for providing a voltage thereon substantially directly proportional to the resistance of said sensor, and said switch adapted in the other position to connect said other unit to said rectifier output and to couple said sensor in parallel with said input for providing a voltage thereon substantially inversely proportional to temperature.

5. The thermostat of claim 4 wherein said resistance is variable, and said multi-pole switch is adapted in said one position to couple said resistance in parallel with said input to said trigger circuit and is adapted in said other position to couple said resistance in series with said input to said trigger circuit.

6. The thermostat of claim 1 including a pair of control rectifier circuits and a pair of trigger circuits, the conduction of each rectifier circuit being controlled by one of said trigger circuits, a first of said rectifier circuits being in series connection with one of said units and the second being in connection with the other of said units, and said branch selecting means is a bridge circuit which includes said sensor, said bridge providing a null voltage at a narrow band of temperatures, said bridge circuit having a first pair of opposed junctions in connection to a DC source and the second pair of opposed junctions in connection of opposite polarity to the input of said trigger circuits for respectively providing conduction of each rectifier circuit and the firing of its load in accordance with temperatures above or below said null temperature.

7. The thermostat of claim 6 wherein said bridge includes an adjustable resistance, said adjustable resistance and said sensor being connected to one of said first pair of junctions and a pair of resistances being connected together at the other junction of said first pair.

8. The thermostat of claim 7 wherein each of said pair of resistances are equal to each other.

9. The thermostat of claim 8 wherein each of said pair of resistors have resistance equal to that of said thermally-responsive sensor at said null temperature.

10. The thermostat of claim 9 wherein each of said rectifier circuits includes a pair of control rectifiers in back to back connection to said alternating current source, and each of said trigger circuits initiates conduction of one pair of said control rectifiers in accordance with the polarity and voltage level of said bridge.

References Cited
UNITED STATES PATENTS

| | | | |
|---|---|---|---|
| 3,243,609 | 3/1966 | Kompelien | 165—26 |
| 3,292,687 | 12/1966 | Evans | 165—26 |
| 3,377,545 | 4/1968 | Tveit | 165—26 |

MEYER PERLIN, Primary Examiner

C. SUKALO, Assistant Examiner